J. O. MARS.
SLACK ADJUSTER.
APPLICATION FILED SEPT. 5, 1911.
1,060,613.
Patented May 6, 1913.
2 SHEETS—SHEET 1.
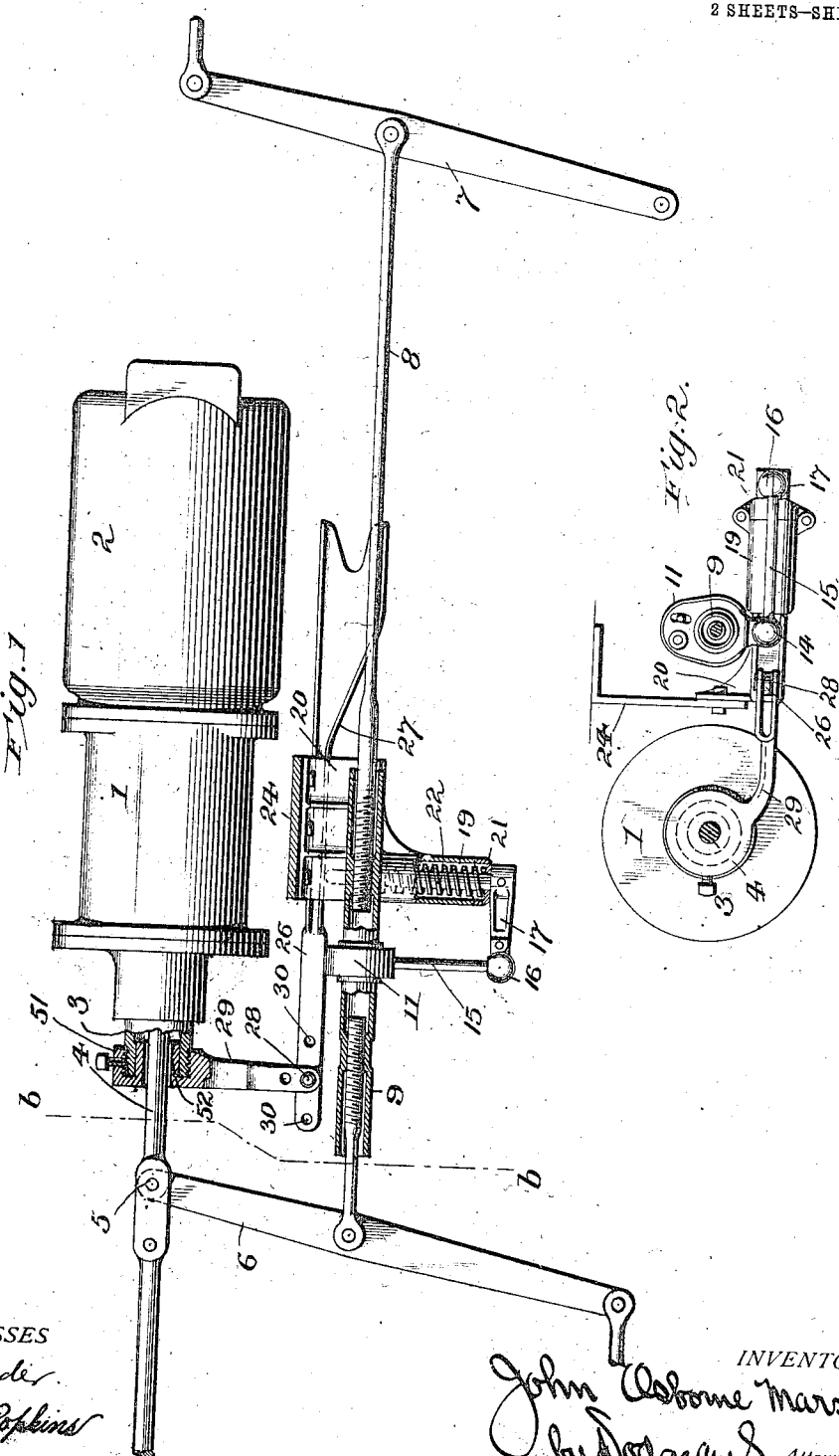
WITNESSES
INVENTOR:
John Osborne Mars
by Dodge and Sons
Attorneys

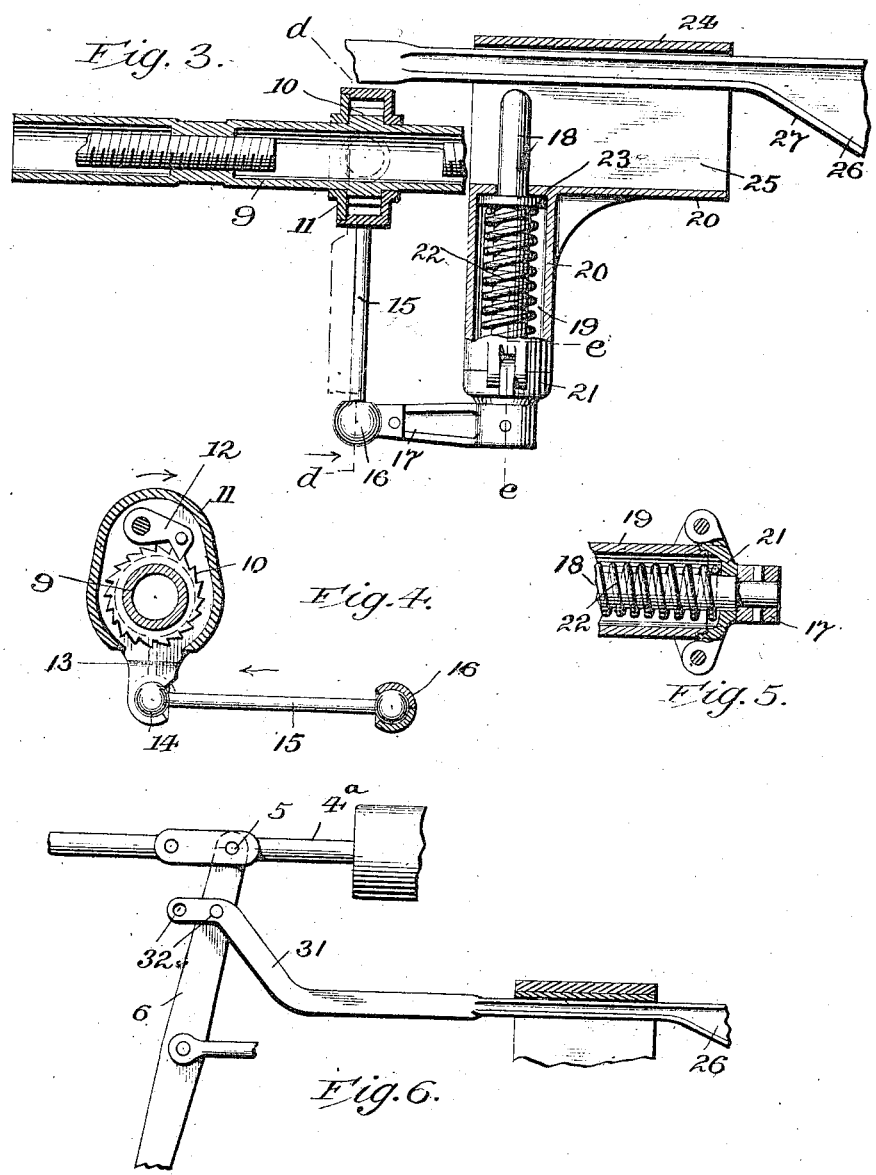

UNITED STATES PATENT OFFICE.

JOHN OSBORNE MARS, OF OMAHA, NEBRASKA.

SLACK-ADJUSTER.

1,060,613.    Specification of Letters Patent.    Patented May 6, 1913.

Application filed September 5, 1911. Serial No. 647,687.

*To all whom it may concern:*

Be it known that I, JOHN OSBORNE MARS, a citizen of the United States, residing at Omaha, in the county of Douglas and State of Nebraska, have invented certain new and useful Improvements in Slack-Adjusters, of which the following is a specification.

This invention relates to slack adjusters for railway brakes, and is designed to secure a uniform piston travel in the brake cylinder, the device being readily adjustable to secure different piston travels, according to the circumstances of the case. It is of great importance that a slack adjuster be readily adjustable in this manner, for when cars having slack adjusters are coupled up in a train with other cars not so provided, the cars having the adjusters are subjected to the brunt of the braking, which is obviously undesirable.

One purpose of my invention, therefore, is to provide an adjuster which may be set to give a variety of piston travel, and another is to so support and guide the parts that accuracy in their action will always be secured.

The preferred embodiments of the invention are illustrated in the accompanying drawings, wherein:

Figure 1 is a plan view of a brake cylinder and part of the brake rigging of a car, showing my slack adjuster applied thereto; Fig. 2 is a section on the line $b$—$b$ of Fig. 1; Fig. 3 is a horizontal section through the actuating-bar guide and the turnbuckle; Fig. 4 is a section on the line $d$—$d$ of Fig. 3; Fig. 5 is a section on the line $e$—$e$ of Fig. 3; and Fig. 6 is a partial plan view, similar to Fig. 1, showing a slightly modified arrangement of the mechanism.

In the drawings, 1 represents the brake cylinder, and 2 the auxiliary reservoir, which are of any of the forms well known in the art.

3 is the piston-rod, and 4 is the usual thrust-rod resting therein, all as well known in the art. The rod 4 is connected at 5 to the brake lever 6 forming a part of the usual brake rigging, the particular form of such rigging being immaterial.

7 is a companion brake lever, the two levers 6 and 7 being connected by a tie-rod 8, which is adjustable in length by means of a turnbuckle 9. The rod 8 is a tension rod, and the length of this rod determines the amount of slack in the brake rigging.

The turnbuckle 9 is provided at about its midlength with ratchet teeth 10, and journaled on the sleeve of the turnbuckle and surrounding the ratchet 10, is a case or frame 11 carrying a pawl 12, which co-acts with the ratchet teeth 10 so that the rocking of the case 11 will produce intermittent rotation of the turnbuckle 9. Case 11 is provided with a depending arm 13, to which is connected by a ball and socket joint 14, a link 15. This link 15 is connected by a ball and socket joint 16 to the laterally extending arm 17 carried by the plunger rod 18.

The above connections are such that longitudinal movements of the plunger 18 will impart a rocking motion to the case 11. The ball joints 14 and 16 permit a limited longitudinal movement of the tie-rod 8 and its turnbuckle 9.

The plunger 18 is guided in a cylindrical guideway or box 19 formed in a guide-casting 20. The box or guideway 19 is provided with a cover 21, and contains a coiled spring 22 which surrounds the plunger 18, and bears against a shoulder 23, to hold the plunger in its inward position. The casting 20 is supported by a bracket 24 attached to the underframe of the car, and contains, in addition to the guideway 19, a second guideway 25, adapted to guide the longitudinal movements of the cam-bar 26. This cam-bar 26 has an inclined face 27 adapted to co-act with the plunger 18, and is connected by a pin 28 to a bracket 29 which is clamped to the piston-rod 3, and moves therewith. A plurality of holes 30 is provided in the cam-bar 26, so that the adjustment of this bar with respect to the brake piston-rod may be readily varied by withdrawing the pin 28, and inserting it in a different hole 30.

Any suitable rigid connection between the bracket 29 and the piston-rod 3 may be used, but I prefer the construction shown in Fig. 1, in which the bracket has a flange 51 threaded onto the outer face of the tubular piston-rod 3 and a boss 52 closely fitting the interior thereof. The thrust-rod 4 passes through the opening formed in the bracket 29 and bears against the end of the tubular piston-rod, as is usual.

In the modification illustrated in Fig. 6, the bracket 29 is dispensed with, and the cam-bar 26 is offset, as shown at 31. A number of holes 32 are provided, and an adjustable pin connection is thereby afforded with the lever 6 at a point adjacent the connection 5 between the rod 4ª and said lever. The rod 4ª in this case is the piston-rod and is directly connected to the piston so that the release spring of the brake cylinder may act to impart the reverse movement to the cam-bar 26.

When the piston-rod 3 moves forward to apply the brakes, the cam-bar 26 moves forward with it, and if the travel of the piston is excessive, the cam surface 27 of the bar 26 will co-act with the plunger 18, and force it outward against the stress of the spring 22. This will rock the case 11 in a counter-clockwise direction as viewed in Fig. 4, so that the pawl 12 will ride over and engage a new tooth of the ratchet 10. When the brakes are released, the reverse movement of the brake piston causes a reverse movement of the cam-bar 26, and the spring 22 forces the plunger 18 to its original position, and rotates the turnbuckle 9 slightly in a direction to take up the slack. This action will be repeated each time the brakes are applied and released until the travel of the piston is limited to the proper amount, at which time the cam surface 27 will not move the plunger 18 far enough for the pawl 12 to engage a new tooth on the ratchet 10. The length of travel is quickly adjusted by inserting the pin 28 in a different hole 30.

The action of the structure shown in Fig. 6 is similar and is adjustable in substantially the same manner.

The advantages of the construction above set forth are, first, the ready adjustability of the travel of the brake piston; second, the positive guiding of the cam-bar 26; and finally, the fact that the operation of the adjuster is not effected by the release spring of the brake cylinder, but by an independent spring 22, so that if the device should become disabled, it will not interfere with the application and release of the brakes. For instance, if the turnbuckle sleeve should become so rusted as to refuse to turn, the plunger 18 will be forced outwardly, and will then remain in that position, permitting the brakes to function in the usual manner even though the adjuster is inoperative. The action of the adjuster is not dependent on a movement of the tie-rod 8, but the parts are so designed as to permit the necessary movements of that rod.

The mechanism is so related to the brake piston that its action is determined directly and solely by the length of travel of said piston, and not by the movement of some related part, as the tie-rod.

Having thus described my invention, what I claim is:—

1. The combination of a brake cylinder; a piston and piston-rod therein; a guide-frame; a cam-bar guided in the guide-frame; an adjustable connection between the cam-bar and the piston-rod; a plunger mounted in the guide-frame and adapted to be moved by excessive movements of the cam-bar; a spring opposing the movement of the plunger; suitable brake rigging in operative relation with the piston rod; a threaded member adapted to adjust the slack in the brake rigging; a pawl and ratchet mechanism adapted to rotate the threaded member; and operative connections between the plunger and the ratchet mechanism.

2. The combination of a brake cylinder; a piston and piston-rod therein; a guide-frame; a cam-bar guided in the guide-frame; means for connecting the cam-bar to move with the piston-rod; a plunger mounted in the frame and adapted to be moved by excessive movements of the cam-bar; a spring opposing the movement of the plunger; brake rigging in operative relation with the piston-rod; a threaded member adapted to adjust the slack in the brake rigging; a pawl and ratchet mechanism adapted to rotate the threaded member in a direction to take up the slack; and operative connections between the plunger and the ratchet mechanism.

3. The combination of a brake cylinder; a piston and piston-rod therein; a bracket attached to the piston-rod; a guide frame; a cam-bar guided in the guide-frame and provided with a plurality of holes; a pin passed through one or another of said holes and engaging the bracket, whereby an adjustable connection between the bar and the bracket is obtained; brake rigging in operative relation with the piston-rod; a threaded member adapted to adjust the slack in the brake rigging; a ratchet mechanism adapted to rotate the threaded member in a direction to take up the slack; and a reciprocating mechanism actuated by excessive movements of the cam-bar, supported by the supporting frame, and connected to the ratchet mechanism to actuate the latter.

4. The combination of a brake cylinder; a piston and piston-rod therein; suitable brake rigging in operative relation with the piston rod; a guide-frame; a reciprocating member guided by the guide-frame and provided with an inclined face; adjustable connections between the reciprocating member and the piston rod; a second reciprocating member adapted to be engaged and moved by the inclined face of the first reciprocating member when it moves an excessive distance; a ratchet mechanism adapted to take up slack in the brake rigging; and operative connections between the second reciprocating member and the ratchet mechanism.

5. The combination of a brake cylinder; a piston and piston-rod therein; brake rigging including a tension rod, and operatively related to the piston-rod; a guide-frame; a cam-bar guided in the guide-frame; adjustable connections between the cam-bar and the piston-rod; a plunger mounted in the guide-frame, and adapted to be moved by excessive movements of the cam-bar; a spring opposing such movement of the plunger; a turn-buckle adapted to adjust the length of the tension rod; a ratchet mechanism adapted to turn the turn-buckle in a direction to shorten the tension rod; and operative connections between the plunger and the ratchet mechanism.

6. The combination of a brake cylinder; a piston and piston-rod therein; a guide-frame; a cam-bar guided in the guide-frame; an adjustable connection between the cam-bar and the piston-rod; a plunger mounted in the guide-frame and adapted to be moved by excessive movements of the cam-bar; a spring opposing the movement of the plunger; suitable brake rigging in operative relation with the piston rod; a threaded member adapted to adjust the slack in the brake rigging; a pawl and ratchet mechanism adapted to rotate the threaded member; and a link having ball and socket connections with the plunger and with the ratchet mechanism.

7. The combination of an air brake cylinder having a tubular piston-rod; suitable brake mechanism actuated thereby; a slack adjusting mechanism for the brake mechanism; a bracket arm threaded on the end of the piston rod and having a boss extending into its end; and operative connections between the bracket arm and the slack adjusting mechanism.

In testimony whereof I have signed my name to this specification in the presence of two subscribing witnesses.

JOHN OSBORNE MARS.

Witnesses:
CORNELIUS J. CAREY,
F. H. KOESTERS.